(No Model.) 2 Sheets—Sheet 2.

P. H. ADAMS, Jr. & O. T. X. ADAMS.
APPARATUS FOR USE IN DECOMPOSING METALLIC SALTS AND DESULPHURIZING ORES.

No. 399,120. Patented Mar. 5, 1889.

UNITED STATES PATENT OFFICE.

PHINEAS H. ADAMS, JR., AND ORSEMAS T. X. ADAMS, OF CHICAGO, ILLINOIS, ASSIGNORS TO MELINDA PECK, OF SAME PLACE.

APPARATUS FOR USE IN DECOMPOSING METALLIC SALTS AND DESULPHURIZING ORES.

SPECIFICATION forming part of Letters Patent No. 399,120, dated March 5, 1889.

Application filed January 3, 1889. Serial No. 295,366. (No model.)

*To all whom it may concern:*

Be it known that we, PHINEAS H. ADAMS, Jr., and ORSEMAS T. X. ADAMS, citizens of the United States, residing at Chicago, Illinois, have invented certain new and useful Improvements in Apparatus for Use in Decomposing Metallic Salts and Desulphurizing Ores, of which the following is a specification.

The object of our invention is to improve an apparatus for mechanically decomposing chemical compounds, metallic salts, and desulphurizing ores or their resulting material, when the substances treated are in a molten condition, by the action of centrifugal force; and our invention has more particular reference to the running-gear employed in such apparatus.

Figure 1:
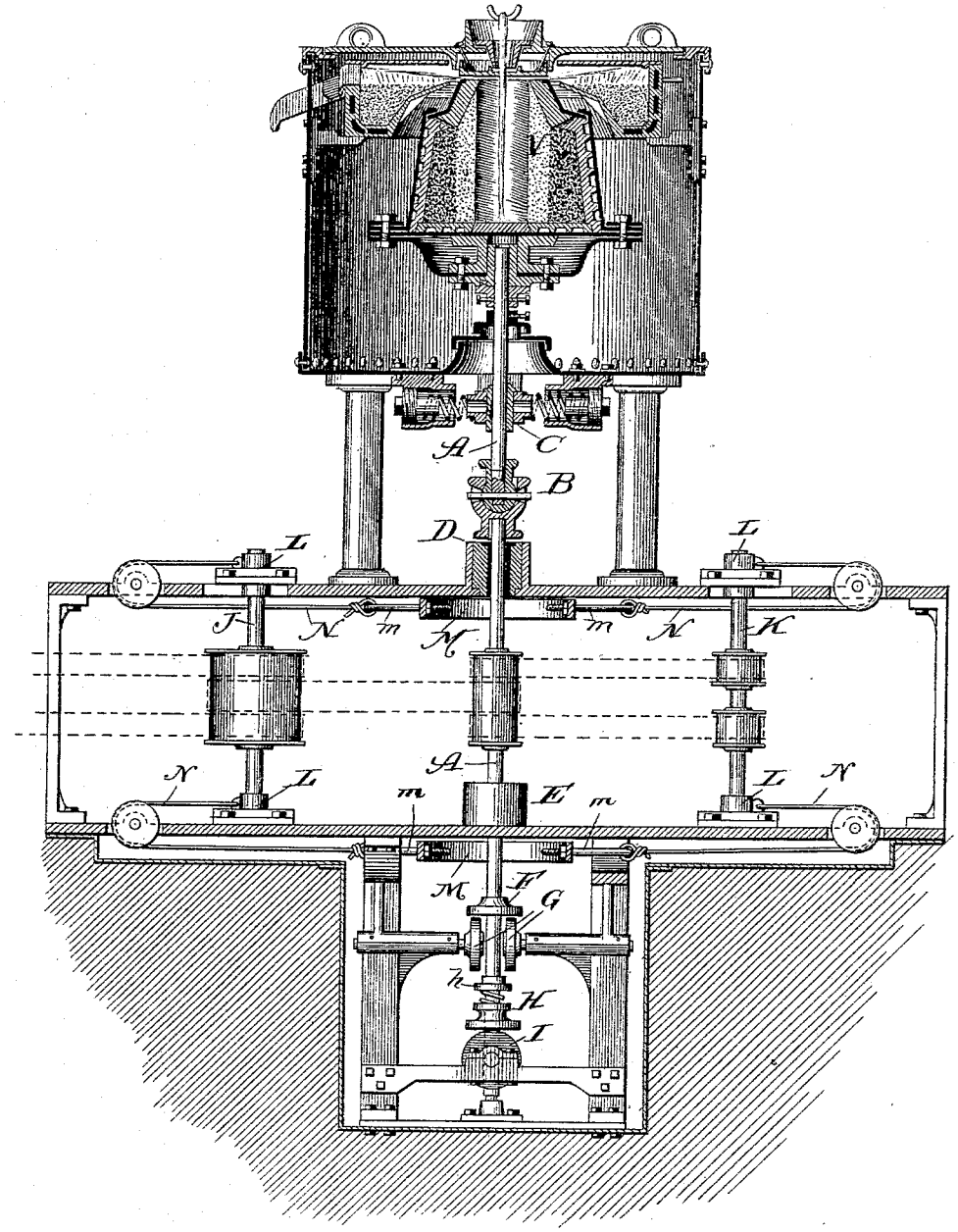
Figure 2:
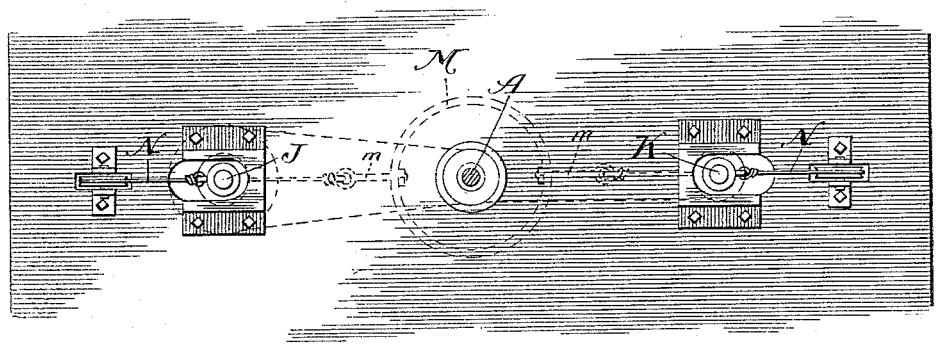
Figure 3:
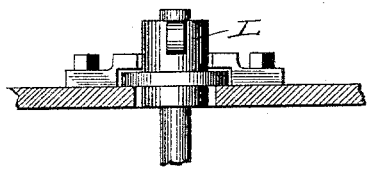
Figure 4:
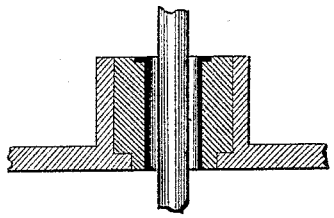

In the drawings, Figure 1 is a vertical section of the apparatus, showing the running-gear in elevation. Fig. 2 is a plan view of the running-gear of the apparatus. Fig. 3 is a detail of one of the upper adjustable journals for the counter or power shafts; and Fig. 4 is a detail of the box or journal for the actuating-shaft immediately below the flexible joint, somewhat modified.

In making our improved apparatus for decomposing chemical compounds, metallic salts, or salts of metal, and desulphurizing ores, we make a receiving-vessel, V, constructed and adapted to receive the substance to be treated when in a molten condition. This receiving-vessel is mounted and rests upon an actuating-shaft, to which it is fixed or keyed in such a way that by the rotation of the shaft the receiving-vessel will be revolved. The receiving-vessel may be made in such way as will secure the required strength and reduce the conduction of heat from the interior to the exterior. It may be surrounded by a curbing and have a removable bottom to facilitate the removal of the material which is not thrown off at the top by the action of centrifugal force, and in other respects it may be made as will be calculated to subserve the end in view and permit of its being rotated at a high rate of speed for the separation of particles of different degrees of density in the matter treated. Many of these parts and the details of their construction, as they do not form the subject-matter of our present claims, need not be more fully described, as they will be sufficiently understood from an inspection of the drawings.

The actuating-shaft A, which serves to rotate the receiving-vessel, is preferably provided with a flexible joint or coupling, B, to enable its upper portion to have a sufficient lateral play to accommodate it to the vibrations of the receiving-vessel when rotated at a high rate of speed. To assist in maintaining it in its position and restore it to its vertical position as it vibrates from one side to another, a laterally-yieldable journal, C, may be provided, as shown in Fig. 1. The actuating-shaft below the flexible joint is arranged in a rigid journal, D, to hold it in its proper position. Farther down on the shaft another journal, E, is provided for the same purpose, and the lower portion of the actuating-shaft is provided with a disk, F, fixed to rotate with it. Immediately under the disk F vertical wheels G are arranged and supported in suitable brackets or bearings, so that the disk F will rest upon their upper peripheries and cause them to rotate as the actuating-shaft is rotated. In this way the friction caused by the rotation of the actuating-shaft in the bearing which sustains its weight with its superimposed load is reduced. In order to still further reduce this friction, we prefer to extend the actuating-shaft somewhat below the vertical wheels G and provide it with another disk, H, which is preferably made vertically movable on the actuating-shaft while rotating with it. This disk H is intended to rest upon vertical wheels I and cause them to rotate in the same manner that the wheels G are rotated. Above the disk H we prefer to arrange a collar or shoulder, *h*, fixed to the shaft, and to interpose between the disk H and the collar or shoulder *h* a coiled spring, as shown in Fig. 1, of such tension as will support about half the weight of the actuating-shaft and its superimposed load. In this way the weight will be divided between the wheels G and I, each receiving about one-half, and as they rotate with the rotation of the shaft extreme or injurious friction will be avoided.

In order to rotate the actuating-shaft with its superimposed load, a power-shaft, J, rotated by the power of the works, is employed having a pulley or belt-surface which is connected to a pulley or belt-surface on the actuating-shaft; but as the lateral strain caused by the pulling of this belt on the actuating-shaft is very great and will draw it to one side toward the power-shaft, and thus cause extreme and lateral friction between the actuating-shaft and its journals, we prefer to employ a counter-shaft, K, located on the opposite side of the actuating-shaft from the power-shaft. This counter-shaft is provided with pulleys or belt-surfaces and connected by belts or bands to the belt-surface on the actuating-shaft, so as to exert a counter strain or pulling to that caused by the belt on the power-shaft. In the drawings we have shown but one counter-shaft; but of course more than one may be employed, if desired. We have arranged both the power-shaft and the counter-shaft in lateral adjustable journals L, to enable them to be moved toward or away from the actuating-shaft, so that their position can at any time be adjusted to regulate the tension of the belts connecting them to the actuating-shaft. The frame-work in which they are arranged may be provided with ways, grooves, or slots to permit the lateral adjustment of the journals; but as ways and slots are a simple matter and readily understood from an inspection of the drawings they need not be minutely described. To adjust the lateral movable journals L and to maintain them in their proper position, as well as to secure the desired tension, we have arranged rings M around the actuating-shaft, as shown in Fig. 1, and have provided these rings with eyebolts *m*, with nuts on their inner ends, permitting them to be adjusted in or out, and have carried cables N from these eyebolts to a position outside of the power and counter shafts and passed them through pulleys or sheaves connecting their ends to eyes in the upper ends of the journals L. By screwing the nuts on the eyebolts *m* in or out the tension of these cables may be regulated—increased or diminished. The tension of the belts connecting the power and counter shafts with the actuating-shaft may thus be equalized, so that their strain or pulling in a lateral direction will be at all times equal to each other. This is done by the employment of means which exert a force or power upon both the power-shaft and the counter-shaft holding them apart against the strain of the belts connecting them with the actuating-shaft, and to effectuate this idea of exerting a power on both of these shafts for the purpose of equalizing the tension of their belts and securing their vibration in unison we have described the particular means shown in our drawings, although other means of exerting a power on the power and counter shafts or their belts can be used, if desired. We have merely described those means which we have preferred.

In Fig. 4 the journal shown as D in Fig. 1 is shown as somewhat modified. The hole through its center is represented as unprovided with any packing or lining fitting around the actuating-shaft. By leaving the journal thus loose no lateral friction between the actuating-shaft and its journal can occur unless the shaft be drawn sufficiently to one side to bear against the boxing, and to prevent this we have provided for the use of one or more counter-shafts, as above explained.

What we regard as new, and desire to secure by Letters Patent, is—

1. In an apparatus for decomposing metallic salts or salts of metals and desulphurizing ores when in a molten state, the combination of a revoluble receiving-vessel adapted to receive molten material to be treated, a revoluble actuating-shaft rotating in a loose journal-box and rotating said vessel as it revolves, one or more counter-shafts with their belts drawing against the actuating-shaft in opposition to the power-shaft to counteract or counterbalance lateral strain and to maintain the actuating-shaft vertical in its loose journal, and means for rotating the actuating-shaft, substantially as described.

2. In an apparatus for decomposing metallic salts or salts of metals and desulphurizing ores when in a molten state, the combination of a revoluble receiving-vessel adapted to receive molten material to be treated, a revoluble actuating-shaft rotating said vessel as it revolves, counter and power shafts adjustable toward and from the actuating-shaft to regulate and equalize the tension of their belts, and with the belt of the counter-shaft drawing against the actuating-shaft in opposition to the power-shaft, means for effecting the adjustment of the counter and power shafts, consisting of a connection holding them apart against the strain of their belts, and means for rotating the actuating-shaft, substantially as described.

PHINEAS H. ADAMS, JR.
ORSEMAS T. X. ADAMS.

Witnesses:
THOMAS A. BANNING,
EPHRAIM BANNING.